(12) United States Patent
Tsukada et al.

(10) Patent No.: US 6,953,819 B2
(45) Date of Patent: Oct. 11, 2005

(54) RESIN COMPOSITION WITH A VINYL ALICYCLIC HYDROCARBON POLYMER

(75) Inventors: Keisuke Tsukada, Kawasaki (JP); Kyoichi Kubomura, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/296,809

(22) PCT Filed: May 31, 2001

(86) PCT No.: PCT/JP01/04610
§ 371 (c)(1),
(2), (4) Date: Nov. 27, 2002

(87) PCT Pub. No.: WO01/92412
PCT Pub. Date: Dec. 6, 2001

(65) Prior Publication Data
US 2003/0158307 A1 Aug. 21, 2003

(30) Foreign Application Priority Data
May 31, 2000 (JP) .............. 2000-162794

(51) Int. Cl.[7] .................................. C08K 5/17
(52) U.S. Cl. ................ 524/236; 524/91; 524/100
(58) Field of Search .............. 524/236, 91, 100

(56) References Cited

U.S. PATENT DOCUMENTS

| | | | | | |
|---|---|---|---|---|---|
| 3,993,855 A | * | 11/1976 | Kang | .................. | 525/338 |
| 4,487,870 A | * | 12/1984 | Bartz | .................. | 524/91 |
| 4,501,857 A | * | 2/1985 | Kishimoto et al. | ......... | 525/338 |
| 4,994,508 A | * | 2/1991 | Shiraki et al. | ............ | 524/14 |
| 5,066,696 A | * | 11/1991 | Bortnick et al. | ........... | 524/91 |
| 5,473,001 A | * | 12/1995 | Myers | .................. | 524/89 |
| 6,001,905 A | * | 12/1999 | Steinmann | .................. | 524/99 |
| 6,365,660 B1 | * | 4/2002 | Suzuki et al. | ............ | 524/437 |

FOREIGN PATENT DOCUMENTS

| | | | |
|---|---|---|---|
| JP | 60-124642 | * | 7/1985 |
| JP | 60-130635 | * | 7/1985 |
| JP | 3-258893 | * | 11/1991 |
| JP | 6-199950 | | 7/1994 |
| JP | 11-316377 | * | 11/1999 |
| JP | 2001-72839 | * | 3/2001 |
| WO | WO 00 699 56 A | | 11/2000 |

* cited by examiner

*Primary Examiner*—David W. Wu
*Assistant Examiner*—Henry S. Hu
(74) *Attorney, Agent, or Firm*—Armstrong, Kratz, Quintos, Hanson & Brooks, LLP (57) ABSTRACT

A resin composition comprising a vinyl alicyclic hydrocarbon polymer and a hindered amine light-resistance stabilizer having a number average molecular weight (Mn) of 1,000 to 10,000 and having excellent processing stability, light-resistance stability, heat resistance and transparency, and a light guide plate obtained by forming or molding the resin composition.

13 Claims, 1 Drawing Sheet

Fig. 1

RESIN COMPOSITION WITH A VINYL ALICYCLIC HYDROCARBON POLYMER

TECHNICAL FIELD

The present invention relates to a resin composition containing a vinyl alicyclic hydrocarbon polymer, and more particularly to a resin composition excellent in processing stability, light-resistance stability, heat resistance, transparency, etc. and suitable for use in a forming or molding material for light guide plates for back light in liquid crystal display devices. The present invention also relates to light guide plates for plane emission illuminator, obtained by forming or molding said resin composition and used in back lights or front lights in liquid crystal display devices.

BACKGROUND ART

A vinyl alicyclic hydrocarbon polymer is prepared by hydrogenating an aromatic ring of a vinyl aromatic polymer, for example, polystyrene. The vinyl alicyclic hydrocarbon polymer is excellent in heat resistance, transparency, low water absorption property, etc. and is hence proposed to be used as a forming or molding material for optical disk substrates. The vinyl alicyclic hydrocarbon polymer is also excellent in chemical resistance, low dissolution property, etc. and is hence proposed to be used as a forming or molding material for medical containers (Japanese Patent Application Laid-Open No. 6-199950).

As described above, the uses of the vinyl alicyclic hydrocarbon polymer are about to be spread. In order to more develop the uses thereof, however, it is necessary to improve it in such a manner that various high properties required of each use can be exhibited while retaining its characteristic excellent properties such as high heat resistance and transparency, and low water absorption property.

Examples of new uses of the vinyl alicyclic hydrocarbon polymer include a light guide plate for a plane emission illuminator used in a back light or front light in a liquid crystal display device (LCD). In recent years, LCDs have been spread as display devices in computers or car navigation systems. The display by LCD is inconvenience in use at a dark place because the LCD itself is non-luminous. Thus, a plane emission illuminator uniformly illuminating a display part of the LCD has been developed for the purpose of permitting improvement in ease of seeing and use at the dark place. In a light transmission type LCD, a back light type that illumination is performed from a back side of a display surface is used, while a front light type that illumination is performed from a front side of a display surface is used in a light reflection type LCD.

Plane emission illuminators are roughly divided into an edge system and a vertical system according to the arrangement of a light source to the display surface. In the back light type, either the edge system or the vertical system is selected as necessary for the end application intended. In the case of the front type, the edge system is used.

Figure 1:
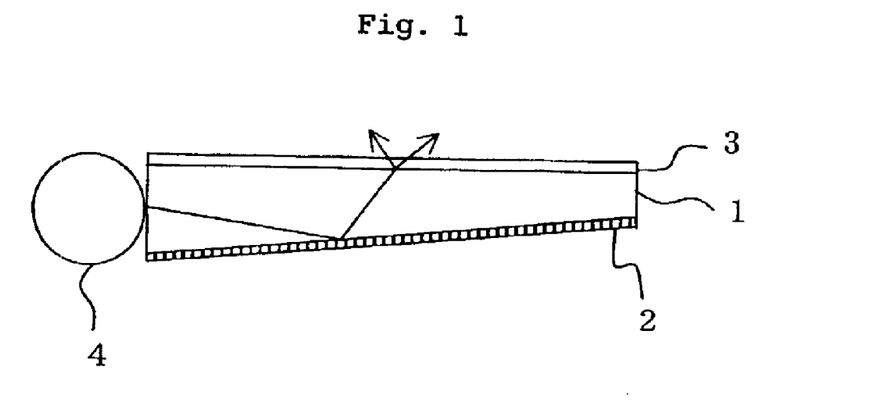
FIG. 1 is a cross-sectional view of an exemplary back light of an edge system in a liquid crystal display device.

FIG. 1 illustrates a cross-sectional view of an exemplary back light of the edge system. A reflection layer 2 for diffusely reflecting light is provided on a back surface of a transparent light guide plate 1. The light from a light source 4 (for example, cold cathode-ray tube) arranged at a side surface of the light guide plate 1 is diffusely reflected or scattered by the reflection layer 2 and collected on the side (upper side in the drawing) of a liquid crystal display panel. A diffusion plate 3 is arranged on the surface of the light guide plate 1 on the side of the liquid crystal display panel as needed. Further, a condenser plate (not illustrated) may be arranged thereon. A reflection plate may be arranged under the reflection layer 2 as needed.

The light guide plate is formed from a transparent synthetic resin such as an acrylic resin for weight saving. As the reflection layer, an ink pattern may be formed on the reflection surface of the light guide plate by printing. Besides, there are reflection layers of various types, such as those obtained by matting the reflection surface of the light guide plate, converting it into a Fresnel mirror or vapor-depositing aluminum thereon. The plane emission illuminator of the edge system may be made thin in thickness or large in size.

The light guide plate for the plane emission illuminator is required to have a high available efficiency of light from a light source (lamp), thereby permitting high luminance, deteriorate physical properties thereof by heat generated from the lamp and have excellent light-resistance stability.

As described above, the vinyl alicyclic hydrocarbon polymer is excellent in heat resistance, transparency, low water absorption property, etc. and hence attracts attention as a forming or molding material for light guide plates for the plane emission illuminators. However, a light guide plate formed with the vinyl alicyclic hydrocarbon polymer involves problems that it is colored by long-term use, and gases of a volatile component or the like are generated to cloud a cold cathode-ray tube (lamp) or a lamp reflector covering the cold cathode-ray tube. Therefore, the vinyl alicyclic hydrocarbon polymer does not fully satisfy high properties required of the use as the forming or molding material for the light guide plates for the plane emission illuminators.

DISCLOSURE OF THE INVENTION

It is an object of the present invention to provide a resin composition which contains a vinyl alicyclic hydrocarbon polymer and is excellent in processing stability, light-resistance stability, heat resistance, transparency, etc. and suitable for use as, for example, a forming or molding material for light guide plates for plane emission illuminators in liquid crystal display devices.

Another object of the present invention is to provide a light guide plate for a plane emission illuminator in a liquid crystal display device, obtained by forming or molding the resin composition having excellent various properties as described above.

The present inventors having carried out an extensive investigation with a view toward achieving the above objects. As a result, it has been found that the above objects can be achieved by a resin composition obtained by incorporating a hindered amine light-resistance stabilizer having a molecular weight within a specified range in a specified amount into a vinyl alicyclic hydrocarbon polymer.

The resin composition according to the present invention is excellent in heat resistance, transparency, light-resistance stability, processing stability, etc. Therefore, a light guide plate for a plane emission illuminator formed with the resin composition according to the present invention not only has high initial luminance, but also is not colored even when it is used for a long period of time under lighting of a lamp and causes neither the lamp nor a lamp reflector to be clouded by generation of gases. The present invention has been led to completion on the basis of these findings.

According to the present invention, there is thus provided a resin composition comprising a vinyl alicyclic hydrocarbon polymer and 0.01 to 20 parts by weight, per 100 parts, by weight of the vinyl alicyclic hydrocarbon polymer, of a hindered amine light-resistance stabilizer having a number average molecular weight of 1,000 to 10,000 as determined by gel permeation chromatography.

According to the present invention, there is also provided a light guide plate for a plane emission illuminator, obtained by forming or molding said resin composition

BEST MODE FOR CARRYING OUT THE INVENTION

1. Vinyl Alicyclic Hydrocarbon Polymer

The vinyl alicyclic hydrocarbon polymer used in the present invention is a polymer having repeating units of a structure that an alicyclic hydrocarbon compound (hereinafter abbreviated as "vinyl alicyclic hydrocarbon compound") having a vinyl group has been subjected to vinyl-addition polymerization.

The vinyl alicyclic hydrocarbon polymer can be prepared by subjecting, for example, a vinyl alicyclic hydrocarbon compound such as a vinylcycloalkene or vinylcycloalkane, or a monomer mixture containing a vinyl alicyclic hydrocarbon compound and a monomer copolymerizable with the vinyl alicyclic hydrocarbon compound to vinyl-addition polymerization and then hydrogenating unsaturated bonds within alicyclic rings in the resulting polymer as needed.

The vinyl alicyclic hydrocarbon polymer can also be prepared by subjecting an aromatic hydrocarbon compound (hereinafter abbreviated as "vinyl aromatic compound") having a vinyl group, or a monomer mixture containing a vinyl aromatic compound and a monomer copolymerizable with the vinyl aromatic compound to vinyl-addition polymerization and then hydrogenating unsaturated bonds within aromatic rings in the resulting polymer as needed.

The vinyl alicyclic hydrocarbon polymer is a homopolymer or copolymer containing, in its main chain, repeating units [1] of a structure represented by the following formula (1):

(1)

wherein X is an alicyclic hydrocarbon group, and $R^1$ to $R^3$ are, independently of one another, a hydrogen atom, linear hydrocarbon group, halogen atom, alkoxy group, hydroxyl group, ester group, cyano group, amide group, imide group, silyl group, or linear hydrocarbon group substituted by a polar group.

In the case of the copolymer, it may be any of a random copolymer, pseudo-random copolymer, graft copolymer and block copolymer. The stereoregularity of the chains of the repeating units [1] may be any of isotactic, syndiotactic and atactic.

In the formula (1), X represents an alicyclic hydrocarbon group. The number of carbon atoms forming the ring of this-alicyclic hydrocarbon group is generally 4 to 20, preferably 5 to 7, more preferably 6 from the viewpoint of low birefringence, mechanical strength, etc.

The alicyclic hydrocarbon group is generally a saturated alicyclic hydrocarbon group. However, carbon-carbon unsaturated bonds may be contained in a low proportion. The content of the carbon-carbon unsaturated bonds is at most 20%, preferably at most 10%, more preferably at most 5% based on the whole carbon-carbon bond from the viewpoints of low birefringence, heat resistance, transparency, etc. The content of the carbon-carbon unsaturated bonds can be determined by $^1$H-NMR measurement.

In the alicyclic hydrocarbon group, a part of hydrogen atoms bonded to carbon atoms forming the ring may be substituted by any of hydrocarbon groups, polar groups and linear hydrocarbon groups substituted by a polar group. Examples of the polar groups include halogen atoms, alkoxy groups, a hydroxyl group, ester group, a cyano group, an amide group, an imide group and a silyl group. An alicyclic hydrocarbon group substituted by a linear hydrocarbon group having 1 to 6 carbon atoms is preferred from the viewpoint of heat resistance, etc.

$R^1$ to $R^3$ are preferably all hydrogen atoms or linear hydrocarbon groups having 1 to 20 carbon atoms (preferably 1 to 6 carbon atoms) from the viewpoint of heat resistance, low birefringence, mechanical strength, etc. The linear hydrocarbon groups may be substituted by a polar group. Examples of the polar group include halogen atoms, alkoxy groups, a hydroxyl group, ester group, a cyano group, an amide group, an imide group and a silyl group. Examples of the linear hydrocarbon groups include alkyl groups and alkenyl groups. Among these, the alkyl groups are preferred. The alkyl groups are preferably alkyl groups having 1 to 20 carbon atoms (preferably 1 to 6 carbon atoms).

The content of the repeating units [1] in the vinyl alicyclic hydrocarbon polymer is generally at least 50% by weight, preferably at least 70% by weight, more preferably at least 80% by weight, most preferably at least 90%, by weight from the viewpoints of heat resistance, low birefringence and mechanical strength.

The repeating unit [1] is preferably a repeating unit [2] represented by the following formula (2):

(2)

wherein $R^1$ to $R^3$ are, independently of one another, a hydrogen atom or an alkyl group having 1 to 20 carbon atoms, and $R^4$ to $R^{14}$ are, independently of one another, a hydrogen atom, an alkyl group having 1 to 20 carbon atoms, a hydroxyl group, an alkoxy group having 1 to 20 carbon atoms or a halogen atom.

The repeating unit [2] is more preferably a repeating unit [3] represented by the following formula (3):

(3)

wherein $R^3$ is a hydrogen atom or an alkyl group having 1 to 20 carbon atoms, and $R^4$ to $R^{14}$ are, independently of one another, a hydrogen atom, an alkyl group having 1 to 20 carbon atoms, a hydroxyl group, an alkoxy group having 1 to 20 carbon atoms or a halogen atom.

An typical example of the repeating unit [3] is a repeating unit [4] represented by the following formula (4)

The weight average molecular weight (Mw) of the vinyl alicyclic hydrocarbon polymer is within a range of generally 10,000 to 1,000,000, preferably 50,000 to 500,000, more preferably 100,000 to 300,000 in terms of polystyrene as determined by gel permeation chromatography (GPC). The molecular weight distribution expressed by a ratio (Mw/Mn) of the weight average molecular weight (Mw) to the number average molecular weight (Mn) is generally 5 or lower, preferably 3 or lower, more preferably 2.5 or lower, most preferably 2 or lower. The vinyl alicyclic hydrocarbon polymer becomes excellent in mechanical strength and heat resistance when the molecular weight distribution (Mw/Mn) thereof falls within the above range, and excellent in the balance among strength properties, forming or molding ability and low birefringence when the weight average molecular weight (Mw) falls within the above range.

The glass transition temperature (Tg) of the vinyl alicyclic hydrocarbon polymer is within a range of generally 50 to 250° C., preferably 70 to 200° C., more preferably 90 to 180° C.

In the present invention, specific example of the vinyl aromatic compound usable as a monomer include styrene and derivatives thereof such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenylstyrene.

Specific examples of the vinyl alicyclic hydrocarbon compound usable as a monomer include vinylcyclohexane and derivatives thereof such as vinylcyclohexane and 3-methylisopropylcyclohexane; and vinylcyclohexene and derivatives thereof such as 4-vinylcyclohexene, 4-isopropylcyclohexene, 1-methyl-4-vinylcyclohexene, 1-methyl-4-isopropenylcyclohexene, 2-methyl-4-vinylcyclohexene and 2-methyl-4-isopropenylcyclohexene.

In the present invention, any other monomer copolymerizable with the above-mentioned monomers may be copolymerized. Examples of the copolymerizable monomer include α-olefin monomers such as ethylene, propylene, isobutene, 2-metyl-1-buten, 2-methyl-1-pentene and 4-methyl-1-pentene; cyclopentadiene monomers such as cyclopentadiene, 1-methyl-cyclopentadiene, 2-methylcyclopentadiene, 2-ethyl-cyclopentadiene, 5-methylcyclopentadiene, 5,5-dimethyl-cyclopentadiene and dicyclopentadiene; monocyclic olefin monomers such as cyclobutene, cyclopentene and cyclohexene; conjugated diene monomers such as butadiene, isoprene, 1,3-pentadiene, furan, thiophene and 1,3-cyclohexadiene; nitrile monomers such as acrylonitrile, methacrylonitrile and α-chloroacrylonitrile; (meth)acrylic ester monomers such as methyl methacrylate, ethyl methacrylate, propyl methacrylate, butyl methacrylate, methyl acrylate, ethyl acrylate, propyl acrylate and butyl acrylate; unsaturated fatty acid monomers such as acrylic acid, methacrylic acid and maleic anhydride; phenylmaleimide; methyl vinyl ether; heterocycle-containing vinyl compound monomers such as N-vinylcarbazole and N-vinyl-2-pyrrolidone.

The mixture of the above-described monomers used in the polymerization preferably contains a vinyl aromatic compound and/or a vinyl alicyclic hydrocarbon compound in a proportion of generally at least 50%, preferably at least 70%, more preferably at least 80% from the viewpoints of heat resistance, low birefringence and mechanical strength. The monomer mixture may contain both vinyl aromatic compound and vinyl alicyclic hydrocarbon compound.

The polymer used in the present invention is obtained by any publicly known process such as radical polymerization, anionic polymerization or cationic polymerization. In the case of the anionic polymerization or cationic polymerization, anionic living polymerization or cationic living polymerization may also be adopted. As a form of the polymerization, any polymerization method such as bulk polymerization, emulsion polymerization, suspension polymerization or solution polymerization may be used. In the case where a hydrogenation reaction is conducted subsequently, however, the solution polymerization is preferred because the hydrogenation reaction can be continuously conducted.

The radical polymerization may be conducted in accordance with any publicly known process. The cationic polymerization may be conducted in the publicly known process making use of $BF_3$ or $PF_6$. In order to obtain a polymer having a high molecular weight and a narrow molecular weight distribution, the anionic living polymerization is preferably adopted. More specifically, the polymerization is conducted by using an organic alkali metal as an initiator in a hydrocarbon solvent. The polymer obtained by the anionic living polymerization has a high molecular weight and a narrow molecular weight distribution and is excellent in mechanical strength.

After the polymerization reaction, the polymer can be collected by any publicly known method such as a steam stripping method, direct desolvent method or alcoholic solidification method. When a solvent inert to the hydrogenation reaction is used in the polymerization, the resulting polymer can be used in the next hydrogenation reaction step as it is without collecting it from a polymer solution.

No particular limitation is imposed on a hydrogenation process, and the hydrogenation can be conducted in accordance with a process known per se in the art. More specifically, when the hydrogenation reaction is conducted by, for example, using a hydrogenation catalyst containing at least one metal selected from the group consisting of nickel, cobalt, iron, titanium, rhodium, platinum, ruthenium and rhenium in an organic solvent, the rate of hydrogenation can be raised, and breaking of a polymer chain attendant on the hydrogenation reaction can be prevented. The use of a nickel catalyst among these hydrogenation catalysts is preferred because the molecular weight distribution (Mw/Mn) of the resulting hydrogenated polymer can be narrowed. The hydrogenation catalyst may be either a heterogeneous catalyst or a homogeneous catalyst.

The hydrogenation reaction is performed by controlling a reaction temperature within a range of generally 10 to 250° C., preferably 50 to 200° C., more preferably 80 to 180° C. under a hydrogen pressure ranging generally from 1 to 300 kg/cm$^2$, preferably from 5 to 250 kg/cm$^2$, more preferably from 10 to 200 kg/cm$^2$.

The rate of hydrogenation of the hydrogenated polymer obtained by the above-described process is generally at least 80%, preferably at least 90%, more preferably at least 95%.

In the present invention, a block copolymer can be used as the vinyl alicyclic hydrocarbon polymer. The block copolymer used in the present invention has the following polymer block [A] and polymer block [B].

The polymer block [A] is a polymer block containing repeating units [3] represented by the following formula (3):

(3)

wherein $R^3$ is a hydrogen atom or an alkyl group having 1 to 20 carbon atoms, and $R^4$ to $R^{14}$ are, independently of one another, a hydrogen atom, an alkyl group having 1 to 20 carbon atoms, a hydroxyl group, an alkoxy group having 1 to 20 carbon atoms or a halogen atom. The content of the repeating units [3] in the polymer block [A] is generally at least 50 mol %, preferably at least 70 mol %, more preferably at least 90 mol %.

In the repeating unit [3] represented by the formula (3), it is preferred that $R^3$ be a hydrogen atom or methyl group, and $R^4$ to $R^{14}$ be hydrogen atoms, and it is more preferred that $R^3$ and $R^4$ to $R^{14}$ be hydrogen atoms.

Accordingly, the repeating unit [3] is more preferably a repeating unit [4] represented by the following formula (4):

(4)

If the content of the repeating units [3] in the polymer block [A] is too low, the mechanical strength of such a block copolymer is deteriorated. The content of the repeating units [3] within the above range is preferred because the block copolymer becomes excellent in low birefringence, light transmission property and mechanical strength.

The remaining portions other than the repeating units [3] in the polymer block [A] are repeating units derived from a linear conjugated diene and/or a linear vinyl compound (for example, α-olefin monomer).

The polymer block [B] is a polymer block containing repeating units [5] represented by the following formula (5):

(5)

wherein $R^{15}$ is a hydrogen atom or an alkyl group having 1 to 20 carbon atoms, and/or repeating units [6] represented by the following formula (6):

(6)

wherein $R^{16}$ to $R^{17}$ are, independently of each other, a hydrogen atom or an alkyl group having 1 to 20 carbon atoms.

The polymer block [B] may contain the repeating units [3]. The content of the repeating units [3] in the polymer block [B] is within a range of from at most the content of the repeating units [3] in the polymer block [A] back to at least 0 mol %. When the content of the repeating units [3] in the polymer block [B] is high, the transparency and heat resistance of the block copolymer are improved. When the content is low, the impact resistance and break strength properties are improved. The content of the repeating units [3] in the polymer block [B] is selected in such a manner that the block copolymer has suitable properties according to the end application thereof.

Supposing that a mole fraction of the repeating units [5] in the polymer block [B] is $m_2$ (mol %), and a mole fraction of the repeating units [6] is $m_3$ (mol %), $2 \times m_2 + m_3$ amounts to generally at least 2 mol %, preferably 5 to 100 mol %, more preferably 30 to 100 mol %.

In the repeating unit [5] represented by the formula (5), it is preferred that $R^{15}$ be a hydrogen atom or methyl group. In the repeating unit [6] represented by the formula (6), it is preferred that $R^{16}$ be a hydrogen atom or methyl group, and $R^{17}$ be a methyl group or ethyl group.

If the content of the repeating units [5] and/or the repeating units [6] in the polymer block [B] is too low, the mechanical strength of the block copolymer is deteriorated. The content of the repeating units [5] and/or the repeating units [6] within the above range in the polymer block [B] is preferred because the block copolymer becomes excellent in low birefringence, light transmission property and mechanical strength.

The polymer block [B] may further contain repeating units [7] represented by the following formula (7):

(7)

wherein $R^{18}$ is a hydrogen atom or an alkyl group having 1 to 20 carbon atoms, $R^{19}$ is a nitrile group, alkoxycarbonyl group, hydrocarbonyl group, hydroxycarbonyl group or halogen atom, and $R^{20}$ is a hydrogen atom, with the proviso that $R^{19}$ and $R^{20}$ may be boned to each other to form an acid anhydride group or amide group.

The content of the repeating units [7] is an amount in such a range that the properties of the block copolymer used in the present invention is not impaired, and is generally at most 30 mol %, preferably at most 20 mol %.

When the block copolymer used in the present invention further contains the repeating units [3] in the polymer block [B], it is preferred that a mole fraction a (mol %) of the repeating units [3] in the polymer block [A] and a mole fraction b (mol %) of the repeating units [3] in the polymer block [B] satisfy the relationship of a>b. It is preferred that a>b be satisfied, since the resulting block copolymer become excellent in low birefringence, light transmission property and mechanical strength.

In the block copolymer used in the present invention, it is desirable that supposing that the number of moles of the whole repeating unit forming the block [A] is $m_a$, and the number of moles of the whole repeating unit forming the block [B] is $m_b$, a ratio ($m_a$:$m_b$) thereof be generally 4:96 to 96:4, preferably 30:70 to 95:5, more preferably 40:60 to 90:10. It is preferred that the ratio ($m_a$:$m_b$) falls within the above range, since the block copolymer becomes excellent in mechanical strength and heat resistance.

The total content of the repeating units [3] in the block copolymer is generally at least 50% by weight, preferably at least 70% by weight.

The block copolymer used in the present invention may be any of diblock, triblock and multi-block copolymers composed of the polymer blocks [A] and [B]. The chain of each block may be not only linear, but also have a branched structure such as a star form. Further, when the polymer blocks [A] and [B] forming the block copolymer are respectively present more than one, they may be the same or different from each other so far as the above-described conditions are satisfied.

The molecular weight of the block copolymer is within a range of generally 10,000 to 1,000,000, preferably 10,000 to 300,000, more preferably 15,000 to 250,000, particularly preferably 20,000 to 200,000 when expressed by a weight average molecular weight (Mw) in terms of polystyrene as determined by GPC. It is preferred that the weight average molecular weight (Mw) of the block polymer falls within the above range, since the block copolymer becomes excellent in the balance among mechanical strength, heat resistance and forming or molding ability.

The molecular weight distribution of the block copolymer may be suitably selected as necessary for the end application intended. The molecular weight distribution (Mw/Mn) expressed by a ratio of the weight average molecular weight (Mw) to the number average molecular weight (Mn) in terms of polystyrene as measured by GPC is generally 5 or lower, preferably 4 or lower, more preferably 3 or lower. It is preferred that the molecular weight distribution (Mw/Mn) falls within the above range, since the block copolymer becomes excellent in mechanical strength and heat resistance.

The glass transition temperature (Tg) of the block copolymer may be suitably selected as necessary for the end application intended. However, it is generally 70 to 150° C., preferably 80 to 140° C., more preferably 90 to 130° C. in terms of a measured value on a high-temperature side by a differential scanning calorimeter (DSC).

The block copolymer used in the present invention can be obtained in accordance with, for example, the following preparation process (I) or (II).

Preparation Process (I) of Block Copolymer:

A preparation process comprising synthesizing a block copolymer having a polymer block [A'] and a polymer block [B'] through at least two steps of:

polymerizing a monomer mixture [a'] containing at least 50 mol % of a vinyl aromatic compound and/or a vinyl alicyclic hydrocarbon compound having an unsaturated bond in its ring to obtain the polymer block [A'] containing repeating units derived from the vinyl aromatic compound and/or the vinyl alicyclic hydrocarbon compound having an unsaturated bond in its ring; and polymerizing a monomer mixture (b') containing at least 2 moles of a vinyl monomer (linear conjugated diene and/or linear vinyl compound) and optionally containing a vinyl aromatic compound and/or a vinyl alicyclic hydrocarbon compound having an unsaturated bond in its ring in a proportion lower than the proportion in the monomer composition [a'] described above to obtain the polymer block [B'] containing repeating units derived from the vinyl monomer and repeating units derived from the vinyl aromatic compound and/or the vinyl alicyclic hydrocarbon compound having an unsaturated bond in its ring, and hydrogenating the aromatic rings and/or unsaturated alicyclic rings in the block copolymer. Preparation process (II) of block copolymer:

A preparation process comprising preparing a block copolymer having a polymer block [A] and a polymer block [B] through at least two steps of:

polymerizing a monomer mixture [a]containing at least 50 mol % of a vinyl alicyclic hydrocarbon compound having a saturated alicyclic ring to obtain the polymer block [A] containing repeating units derived from the vinyl alicyclic hydrocarbon compound; and polymerizing a monomer mixture (b) containing at least 2 moles of a vinyl monomer and optionally containing a vinyl alicyclic hydrocarbon compound having a saturated alicyclic ring in a proportion lower than the proportion in the monomer composition [a]described above to obtain the polymer block [B] containing repeating units derived from the vinyl monomer and repeating units derived from the vinyl alicyclic hydrocarbon compound.

Among the above-described processes, the preparation process (I) is preferred from the viewpoints of availability of the monomers, polymerization yield, easy introduction of the repeating units [3] into the polymer block [B'], etc.

Specific examples of the vinyl aromatic compound used in the preparation process (I) of the block copolymer include styrene and derivatives thereof such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2- methylstyrene, monochlorostyrene, dichlorostyrene, monofluorostyrene and 4-phenylstyrene. Styrene derivatives having a subsistent group such as a hydroxyl group or alkoxyl group may also be used. Among these, styrene, 2-methylstyrene, 3-methylstyrene and 4-methylstyrene are preferred.

Specific examples of the vinyl alicyclic hydrocarbon compound having an unsaturated alicyclic ring used in the preparation process (I) of the block copolymer include cyclohexenylethylene (i.e., vinylcyclohexene) and derivatives thereof such as cyclohexenylethylene, α-methylcyclohexenylethylene and α-t-butylcyclohexenylethylene; and cyclohexenylethylene derivatives having a subsistent group such as a halogen group, alkoxy group or hydroxyl group.

These vinyl aromatic compounds and vinyl alicyclic hydrocarbon compounds having an unsaturated alicyclic ring may be used either singly or in any combination thereof. In the present invention, the vinyl aromatic compound is preferably caused to be contained in both monomer mixtures [a'] and [b']. In particular, styrene or α-methylstyrene is more preferably used.

The vinyl monomer used in the preparation processes is a linear vinyl compound or linear conjugated diene compound.

Specific examples of the linear vinyl compound include α-olefin monomers such as ethylene, propylene, 1-butene, 1-pentene and 4-methyl-1-pentene. Among these, ethylene, propylene and 1-butene are preferred.

Examples of the linear conjugated diene compound include conjugated diene monomers such as butadiene (for example, 1,3-butadiene and 1,2-butadiene), isoprene, 2,3-dimethyl-1,3-butadiene, 1,3-pentadiene and 1,3-hexadiene.

Among the vinyl monomers, the linear conjugated diene compounds are preferred, with butadiene and isoprene being particularly preferred. These linear vinyl compounds and linear conjugated diene compounds may be used either singly or in any combination thereof.

When the monomer mixture is polymerized, a polymerization reaction may be conducted by any process of radical polymerization, anionic polymerization, cationic polymerization, etc. However, the anionic polymerization is preferred, with living anionic polymerization in the presence of an inert solvent being more preferred.

The anionic polymerization is performed in a temperature range of generally 0 to 200° C., preferably 20 to 100° C., particularly preferably 20 to 80° C. in the presence of a polymerization initiator. As the initiator, may be used, for example, a mono-organolithium such as n-butyllithium, sec-butyllithium, t-butyllithium, hexyllithium or phenyllithium; or a polyfunctional organolithium compound such as dilithiomethane, 1,4-dilithobutane or 1,4-dilithio-2-ethylcyclohexane.

Examples of the inert solvent used include aliphatic hydrocarbons such as n-butane, n-pentane, isopentane, n-hexane, n-heptane and isooctane; alicyclic hydrocarbons such as cyclopentane, cyclohexane, methylcyclopentane, methylcyclohexane and decalin; and aromatic hydrocarbons such as benzene and toluene. When an aliphatic hydrocarbon or alicyclic hydrocarbon among these is used as the solvent, the resulting reaction mixture may be used in the next hydrogenation reaction as it is because the solvent is a solvent inert to the hydrogenation reaction as well. These solvents may be used either singly or in any combination thereof. The solvent is generally used in a proportion of 200 to 10,000 parts by weight per 100 parts by weight of the whole monomer.

When it is necessary to prevent a chain of a certain component in each block from elongating upon polymerization of each polymer block, a polymerization promoter, randomizer or the like may be used. When the polymerization reaction is conducted by anionic polymerization, a Lewis base compound or the like may be used as the randomizer.

Specific examples of the Lewis base compound include ether compounds such as dimethyl ether, diethyl ether, diisopropyl ether, dibutyl ether, tetrahydrofuran, diphenyl ether, ethylene glycol diethyl ether and ethylene glycol methyl phenyl ether; tertiary amine compounds such as tetramethylenediamine, trimethylamine, triethylamine and pyridine; alkali metal alkoxide compounds such as potassium-t-amyl oxide and potassium-t-butyl oxide; and phosphine compounds such as triphenylphosphine. These Lewis bases may be used either singly or in any combination thereof.

Examples of a process for obtaining the block copolymer by living anionic polymerization include the conventionally known stepwise addition polymerization reaction process and coupling process. The stepwise addition polymerization reaction process is preferred.

When the block copolymer having the polymer block [A'] and the polymer block [B'] is obtained by the stepwise addition polymerization reaction process, the step of obtaining the polymer block [A'] and the step of obtaining the polymer block [B'] are successively continuously performed. Specifically, the monomer mixture [a'] is polymerized in the presence of a living anionic polymerization catalyst in an inert solvent to synthesize the polymer block [A'], and the monomer mixture [b'] is successively added to the reaction system thereof to continue the polymerization to obtain the polymer block [B'] bonded to the polymer block [A']. Similarly, a block copolymer having a structure of Polymer Block [A']-Polymer Block [B']-Polymer Block [A'] can by synthesized.

The resultant block copolymer is collected by a publicly known method, for example, a steam stripping method, direct desolvent method or alcoholic solidification method. When a solvent inert to a hydrogenation reaction is used in the polymerization reaction, the reaction mixture can be used in the next hydrogenation reaction step as it is. Therefore, the block copolymer may not be collected at this step.

Among the block copolymers (hereinafter referred to as "prehydrogenation block copolymers") having the polymer block [A'] and the polymer block [B'], those having respective repeating units of the following structures are preferred.

The polymer block [A'] forming the prehydrogenation block copolymers is preferably a polymer block containing at least 50 mol % of repeating units [8] represented by the following formula (8):

(8)

wherein $R^{21}$ is a hydrogen atom or an alkyl group having 1 to 20 carbon atoms, and $R^{22}$ to $R^{26}$ are, independently of one another, a hydrogen atom, an alkyl group having 1 to 20 carbon atoms, a hydroxyl group, an alkoxy group having 1 to 20 carbon atoms or a halogen atom.

In the repeating unit [8], it is preferred that $R^{21}$ be a hydrogen atom or methyl group, and $R^{22}$ to $R^{26}$ be hydrogen atoms, and it is more preferred that $R^{21}$ and $R^{22}$ to $R^{26}$ be hydrogen atoms.

Accordingly, the repeating unit [8] is more preferably a repeating unit [9] represented by the following formula (9):

(9)

The polymer block [B'] is preferably a polymer block optionally containing the repeating units [8] and containing repeating units [10] represented by the following formula (10):

(10)

wherein $R^{27}$ is a hydrogen atom or an alkyl group having 1 to 20 carbon atoms, and/or a polymer block containing repeating units [11] represented by the following formula (11):

(11)

wherein $R^{28}$ is a hydrogen atom or an alkyl group having 1 to 20 carbon atoms, and $R^{29}$ is a hydrogen atom or an alkyl or alkenyl group having 1 to 20 carbon atoms.

When the repeating units [8] is contained in the polymer block [B'], it is preferred that a mole fraction a' (mol %) of the repeating units [8] in the polymer block [A'] and a mole fraction b' (mol %) of the repeating units [8] in the polymer block [B'] satisfy the relationship of a'>b'.

The polymer block [B'] may further contain repeating units [12] represented by the following formula (12):

(12)

wherein $R^{30}$ is a hydrogen atom or an alkyl group having 1 to 20 carbon atoms, $R^{31}$ is a nitrile group, alkoxycarbonyl group, hydrocarbonyl group, hydroxycarbonyl group or halogen atom, and $R^{32}$ is a hydrogen atom, with the proviso that $R^{31}$ and $R^{32}$ may be boned to each other to form an acid anhydride group or amide group.

In the prehydrogenation block copolymer, it is desirable that supposing that the number of moles of the whole repeating unit forming the block [A'] is $m_a'$, and the number of moles of the whole repeating unit forming the block [B] is $m_b'$, a ratio ($m_a':m_b'$) thereof be generally 4:96 to 96:4, preferably 30:70 to 95:5, more preferably 40:60 to 90:10. It is preferred that the ratio ($m_a':m_b'$) falls within the above range, since the finally obtained block copolymer becomes excellent in mechanical strength and heat resistance.

The molecular weight of the prehydrogenation block copolymer is generally at least 12,000, preferably within a range of 12,000 to 400,000, more preferably 19,000 to 350,000, particularly preferably 25,000 to 300,000 when expressed by a weight average molecular weight (Mw) in terms of polystyrene as determined by GPC. When the weight average molecular weight (Mw) of the prehydrogenation block polymer is too low, the mechanical strength of the block copolymer obtained after the hydrogenation is deteriorated. If the molecular weight is too high, it is difficult to fully raise the rate of hydrogenation.

The molecular weight distribution of the prehydrogenation block copolymer may be suitably selected as necessary for the end application intended. However, the molecular weight distribution (Mw/Mn) expressed by a ratio of the weight average molecular weight (Mw) to the number average molecular weight (Mn) in terms of polystyrene (or polyisoprene) as measured by GPC is preferably 5 or lower, more preferably 4 or lower, particularly preferably 3 or lower. When the molecular weight distribution (Mw/Mn) of the prehydrogenation block copolymer falls within the above range, the rate of hydrogenation is enhanced.

The glass transition temperature (Tg) of the prehydrogenation block copolymer may be suitably selected as necessary for the end application intended. However, it is preferably 70 to 150° C., more preferably 80 to 140° C., particularly preferably 90 to 130° C. in terms of a measured value on a high-temperature side by a differential scanning calorimeter (DSC).

No particular limitation is imposed on a process for hydrogenating carbon-carbon unsaturated bonds in unsaturated rings of the prehydrogenation block copolymer, such as aromatic rings and cycloalkene rings, and unsaturated bonds in main and side chains, and the hydrogenation can be conducted in accordance with such a publicly known process as described above. Here, reaction conditions suitable for hydrogenation of the prehydrogenation block copolymer will be described.

As the hydrogenation process, is preferred a process by which the rate of hydrogenation can be raised, and a breaking reaction of a polymer chain is little. As a specific example thereof, may be mentioned a process making use of a hydrogenation catalyst containing at least one metal selected from the group consisting of nickel, cobalt, iron, titanium, rhodium, platinum, ruthenium and rhenium in an organic solvent, As the hydrogenation catalyst, may be used either a heterogeneous catalyst or a homogeneous catalyst.

The heterogeneous catalyst may be used in the form of a metal or a metal compound or in a form carried on a proper support. Examples of the support include activated carbon, silica, alumina, calcium carbonate, titania, magnesia, zirconia, diatomaceous earth and silicon carbide. The amount of the catalyst carried is within a range of generally 0.01 to 80% by weight, preferably 0.05 to 60% by weight.

As the homogeneous catalyst, may be used a catalyst with a nickel, cobalt, titanium or iron compound combined with an organometallic compound (for example, organoaluminum compound or organolithium compound); or an organometallic complex of rhodium, palladium, platinum, ruthenium, rhenium or the like. As the nickel, cobalt, titanium or iron compound, may be used, for example, an acetylacetone salt, naphthenic acid salt or cyclopentadienyl compound of each of such metals. As the organoaluminum compound, may be suitably used an alkylaluminum such as triethylaluminum or triisobutylaluminum; an aluminum halide such as diethylaluminum chloride or ethylaluminum dichloride; or a hydrogenated alkylaluminum such as diisobutylaluminum hydride.

As examples of the organometallic complex catalyst, may be used metal complexes such as γ-dichloro-π-benzene complexes, dichloro-tris(triphenylphosphine) complexes and hydride-chloro-(triphenylphosphine) complexes of the above respective metals.

These hydrogenation catalysts may be used either singly or in any combination thereof. The amount of the hydrogenation catalyst used is generally 0.01 to 100 parts by weight, preferably 0.05 to 50 parts by weight, more preferably 0.1 to 30 parts by weight per 100 parts by weight of the polymer.

The reaction temperature in the hydrogenation is generally 10 to 250° C. However, it is preferably 50 to 200° C., more preferably 80 to 180° C. in that the rate of hydrogenation can be raised, and a breaking reaction of a polymer chain can be lessened.

The pressure in the hydrogenation is generally 0.1 to 30 Mpa. However, it is selected from a range of preferably 1 to 20 Mpa, more preferably 2 to 10 Mpa from the viewpoint of operating ability in addition to the reasons described above.

The rate of hydrogenation of the block copolymer obtained by the hydrogenation reaction is generally at least 90%, preferably at least 95%, more preferably at least 97% for both carbon-carbon unsaturated bonds in the main and side chains and carbon-carbon unsaturated bonds in the aromatic and cycloalkene rings as determined by $^1$H-NMR. When the rate of hydrogenation is low, the resulting block copolymer tends to deteriorate the low birefringence, heat stability, etc.

After completion of the hydrogenation reaction, the block copolymer is collected in accordance with, for example, a method in which the solvent is removed by direct drying, or a method in which the reaction solution is poured into a poor solvent to the block copolymer to solidify the block copolymer after the hydrogenation catalyst is removed from the reaction solution by a method of filtration, centrifugation or the like.

2. Hindered Amine Light-resistance Stabilizer:

The hindered amine light-resistance stabilizer (hereinafter abbreviated as "HALS") used in the present invention is a compound having a plurality of piperidine rings with substituent group(s) bonded to both carbon atoms adjacent to the nitrogen atom. In the present invention, is used HALS having a number average molecular weight (Mn) of 1,000 to 10,000, preferably 2,000 to 5,000, more preferably 2,800 to 3,800 as determined by GPC using tetrahydrofuran (THE) as a solvent.

The subsistent groups bonded to the carbon atoms adjacent to the nitrogen atom are preferably alkyl groups such as methyl and ethyl groups. The stabilizer is more preferably such that 2 methyl groups are bonded to each of the carbon atoms.

If the number average molecular weight (Mn) of HALS is too low, HALS is vaporized upon mixing it into the vinyl alicyclic hydrocarbon polymer by melting and kneading under heat to fail to mix it in a prescribed amount, or a cause that foaming or silver streak occurs upon heating and melt molding by injection molding is formed to deteriorate the processing stability of the resulting resin composition.

If the number average molecular weight (Mn) of HALS is too low, a volatile component is generated as a gas from a light guide plate obtained by molding a resin composition incorporating HALS when the light guide plate is used for a long period of time in a state that a lamp has been lighted.

If the number average molecular weight (Mn) of HALS is too high, its dispersibility in the vinyl alicyclic hydrocarbon polymer is deteriorated to lower the transparency of the resulting resin composition and reduce the improving effect on light resistance. The number average molecular weight (Mn) of HALS is controlled within the above range, thereby obtaining a resin composition excellent in processing stability, low gas generating tendency and transparency.

Examples of HALS preferably used in the present invention include high molecular weight HALSs with a plurality of piperidine rings bonded through a triazine skeleton, such as N,N',N'',N'''-tetrakis-[4,6-bis-[butyl-(N-methyl-2,2,6,6-tetramethylpyridin-4-yl)amino]-triazin-2-yl]-4,7-diazadecane-1,10-diamine, polycondensates of dibutylamine, 1,3,5-triazine and N,N'-bis(2,2,6,6-tetramethyl-4-piperidyl)butylamine, poly[{(1,1,3,3-tetramethylbutyl)amino-1,3,5-triazin-2,4-diyl}{(2,2,6,6-tetramethyl-4-piperidyl)imino}-hexamethylene{(2,2,6,6-tetramethyl-4-piperidyl)imino}], polycondensates of 1,6-hexanediamine-N,N'-bis(2,2,6,6-tetramethyl-4-piperidyl) and morpholine-2,4,6-trichloro-1,3,5-triazine, and poly[(6-morpholino-s-triazin-2,4-diyl)[(2,2,6,6-tetramethyl-4-piperidyl)imino]-hexamethylene[(2,2,6,6-tetramethyl-4-piperidyl)imino]]; and high molecular weight HALSs with piperidine rings bonded through an ester linkage, such as polymers of dimethyl succinate and 4-hydroxy-2,2,6,6-tetramethyl-1-piperidine ethanol, and mixed ester compounds of 1,2,3,4-butanetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane.

Among these, the polycondensates of dibutylamine, 1,3,5-triazine and N,N'-bis(2,2,6,6-tetramethyl-4-piperidyl)butylamine, poly[{(1,1,3,3-tetramethylbutyl)-amino-1,3,5-triazin-2,4-diyl}{(2,2,6,6-tetramethyl-4-piperidyl)imino}-hexamethylene{(2,2,6,6-tetramethyl-4-piperidyl)imino}] and polymers of dimethyl succinate and 4-hydroxy-2,2,6,6-tetramethyl-1-piperidine ethanol which have a number average molecular weight (Mn) of 2,000 to 5,000 are preferred.

HALS is incorporated within a range of generally 0.01 to 20 parts by weight, preferably 0.02 to 15 parts by weight, more preferably 0.05 to 10 parts by weight per 100 parts by weight of the vinyl alicyclic hydrocarbon polymer. If the amount of HALS incorporated is too small, the improving effect on light-resistance stability is not sufficiently achieved, and so coloring occurs when a light guide plate formed with a resin composition incorporating such HALS is used in a long period of time in a state that a lamp has been lighted. If the amount of HALS incorporated is too great, a part thereof is vaporized as a gas, and its dispersibility in the vinyl alicyclic hydrocarbon polymer is deteriorated to lower the transparency of the resulting resin composition.

HALS preferably has a melting point of at least 20° C., more preferably at least 40° C. If the melting point of HALS is too low, the viscosity of a molten resin is lowered to an excessive extent when it is heated and melt kneaded into the vinyl alicyclic hydrocarbon polymer by means of a twin-screw kneader or the like, and so such problems that HALS is not evenly dispersed in the molten resin arise.

3. Ultraviolet Absorbent:

The resin composition according to the present invention can be further improved in light-resistance stability by using HALS and an ultraviolet absorbent in combination.

Examples of the ultraviolet absorbent include benzophenone type ultraviolet absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxy-benzophenone, 4-dodecyloxy-2-hydroxybenzophenone and bis(5-benzoyl-4-hydroxy-2-methoxyphenyl)methane; and benzotriazole type ultraviolet absorbents such as 2-(2'-hydroxy-5'-methylphenyl) benzotriazole, 2-(2H-benzotriazol-2-yl)-4-methyl-6-(3,4,5, 6-tetrahydrophthalimidylmethyl)-phenol, 2-(2H-benzotriazol-2-yl)-4,6-bis(1-methyl-1-phenylethyl)phenol, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-5'-tert-octylphenyl) benzotriazole, 2-(2'-hydroxy-3',5'-di-tert-amylphenyl) benzotriazole, 2-[2'-hydroxy-3'-(3",4",5",6"-tetrahydrophthalimidomethyl)-5'-methylphenyl] benzotriazole and 2,2'-methylenebis[4-(1,1,3,3-tetramethylbutyl)-6-(2H-benzotriazol-2-yl)phenol].

Among these, 2-(2'-hydroxy-5'-methylphenyl)-benzotriazole, 2-(2H-benzotriazol-2-yl)-4-methyl-6-(3,4,5, 6-tetrahydrophthalimidylmethyl)phenol and 2-(2H-benzotriazol-2-yl)-4,6-bis(1-methyl-1-phenylethyl)phenol are preferred from the viewpoints of heat resistance, low volatility, etc.

The ultraviolet absorbent is incorporated within a range of generally 0.01 to 10 parts by weight, preferably 0.02 to 5 parts by weight, more preferably 0.05 to 2 parts by weight per 100 parts by weight of the vinyl alicyclic hydrocarbon polymer. If the amount of the ultraviolet absorbent incorporated is too small, the further improving effect on light-resistance stability is not sufficiently achieved. If the amount of the ultraviolet absorbent incorporated is too great, the processing stability of the resulting resin composition is deteriorated, and the resin composition is liable to generate gases.

4. Other Compounding Additives:

Into the vinyl alicyclic hydrocarbon polymer according to the present invention, may be incorporated various kinds of compounding additives such as antioxidants and ultraviolet absorbents as needed.

Examples of the antioxidants include phenolic antioxidants, phosphorus antioxidants and sulfur antioxidants. Among these, the phenolic antioxidants, particularly, alkyl-substituted phenolic antioxidants are preferred. These antioxidants are incorporated, whereby coloring and reduction of strength of the resulting light guide plate due to deterioration by oxidation upon molding or forming can be prevented without impairing the transparency and low water absorption property thereof.

The amount of the antioxidant incorporated is suitably selected within limits not impeding the objects of the present invention. However, it is generally 0.001 to 5 parts by weight, preferably 0.01 to 1 part by weight per 100 parts by weight of the vinyl alicyclic hydrocarbon polymer.

At least one compounding additive selected from the group consisting of (i) a soft polymer, (ii) an alcoholic compound and (iii) an organic or inorganic filler is incorporated into the vinyl alicyclic hydrocarbon polymer, whereby clouding of the resulting resin composition when exposed for a long period of time under high-temperature and high-humidity environment can be prevented without deteriorating various properties such as transparency, low water absorption property and mechanical strength.

Among these, the soft polymer and alcoholic compound are preferred because they are excellent in clouding preventing ability under the high-temperature and high-humidity environment.

(i) Soft Polymer:

The soft polymer used in the present invention is a polymer having a glass transition temperature (Tg) of generally at most 30° C. When a polymer has a plurality of Tgs, such a polymer may also be included in the soft polymer so far as its lowest Tg is at most 30° C.

As specific examples of the soft polymers, may be mentioned olefin-based soft polymers such as polyethylene, polypropylene, poly(1-butene), ethylene.α-olefin copolymers, propylene.α-olefin copolymers, ethylene.propylene.diene terpolymers (EPDMs) and ethylene.propylene.styrene copolymers; isobutyrene-based soft polymers such as polyisobutylene, isobutylene.isoprene rubber and isobutylene.styrene copolymers; diene-based soft polymers such as polybutadiene, polyisoprene, butadiene.styrene random copolymers, isoprene.styrene random copolymers, acrylonitrile.butadiene copolymers, acrylonitrile.butadiene.styrene terpolymers, butadiene.styrene block copolymers, styrene.butadiene.styrene block copolymers, isoprene.styrene block copolymers and styrene.isoprene.styrene block copolymers; silicon-containing soft polymers such as dimethyl polysiloxane, diphenyl polysiloxane and dihydroxy polysiloxane; soft polymers composed of an α,β-unsaturated acid, such as polybutyl acrylate, polybutyl methacrylate, polyhydroxyethyl methacrylate and butyl acrylate.styrene copolymers; soft polymers composed of an unsaturated alcohol and an amine or an acyl derivative thereof, or acetal, such as polyvinyl stearate; epoxy compound-based soft polymers such as polyethylene oxide, polypropylene oxide and epichlorohydrin rubber; fluorine-containing soft polymers such as vinylidene fluoride rubber and ethylene tetrafluoride-propylene rubber; and other soft polymers such as natural rubber, polypeptide, proteins, polyester-based thermoplastic elastomers, vinyl chloride-based thermoplastic elastomers and polyamide-based thermoplastic elastomers. These soft polymers may have a crosslinked structure or may be modified by introducing a functional group.

Among these soft polymers, the diene-based soft polymers are preferred, with hydrogenated products obtained by hydrogenating carbon-carbon unsaturated bonds in the diene-based soft polymers being particularly excellent in rubber elasticity, mechanical strength, flexibility and dispersibility.

(ii) Alcoholic compound:

The alcoholic compound suitably used in the present invention is preferably a compound having at least one alcoholic hydroxyl group and at least one ether linkage or ester linkage in its molecule, with a compound having at least two alcoholic hydroxyl groups being more preferred. Examples of such a compound include partially etherified compounds and partially esterified compounds obtained by etherifying or esterifying at least one hydroxyl group of a dihydric or still higher polyhydric alcohol.

Specific examples of the alcoholic compound include alcoholic esterified compounds such as glycerol monostearate, glycerol monolaurate, glycerol monobehenate, diglycerol monostearate, glycerol distearate, glycerol dilaurate, pentaerythritol monostearate, pentaerythoritol monolaurate, pentaerythoritol monobehenate, pentaerythoritol distearate, pentaerythoritol dilaurate, pentaerythoritol tristearate and dipentaerythoritol distearate; 3-(octyloxy)-1,2-propanediol, 3-(decyloxy)-1,2-propanediol, 3-(lauryloxy)-1,2-propanediol, 3-(4- nonylphenyhloxy)-1,2-propanediol, 1,6-dihydroxy-2,2'-di (hydroxymethyl)-7-(4-nonylphenyloxy)-4-oxoheptane, alcoholic ether compounds obtained by a reaction of a condensate of p-nonyl phenyl ether and formaldehyde with glycidol; alcoholic ether compounds obtained by a reaction of a condensate of p-octyl phenyl ether and formaldehyde with glycidol; and alcoholic ether compounds obtained by a reaction of a condensate of p-octyl phenyl ether and dicyclopentadiene with glycidol.

These alcoholic compounds may be used either singly or in any combination thereof. No particular limitation is imposed on the molecular weight of the alcoholic compound. However, it is desirable that the molecular weight be preferably 500 to 2000, more preferably 800 to 1,500 in that the transparency of the resulting resin composition is scarcely lowered.

Said at least one compounding additive selected from the group consisting of (i) a soft polymer, (ii) an alcoholic compound and (iii) an organic or inorganic filler is incorporated in a range of generally 0.1 to 10 parts by weight, preferably 0.02 to 5 parts by weight, more preferably 0.05 to 2 parts by weight per 100 parts by weight of the vinyl alicyclic hydrocarbon polymer. These compounding additives are used in a proper amount, whereby clouding of a formed or molded article formed from the resulting resin composition can be prevented without lowering the properties inherent in the vinyl alicyclic hydrocarbon polymer. If the amount of these compounding additives incorporated is too great, the glass transition temperature and transparency of the resin composition are lowered.

5. Resin Composition:

The resin composition according to the present invention can be prepared by, for example, melting and kneading the vinyl alicyclic hydrocarbon polymer and various kinds of the components by means of a mixer, twin-screw kneader, roll, brabender or extruder, or dissolving or dispersing them in a proper solvent to solidify them. When the twin-screw kneader is used, it is preferred that the resulting resin composition be melt-extruded in the form of a strand after the kneading, and the strand be cut by a pelletizer to provide pellets.

The resin composition according to the present invention can be formed or molded into various kinds of formed or molded articles by a melt molding or forming process such as injection molding, extrusion, press molding or blow molding. A solution casting process can also be adopted. In order to obtain a molded article excellent in transparency, low birefringence, dimensional stability, etc., the injection molding is preferred.

The injection molding is performed under conditions of a resin temperature within a range of generally 150 to 400° C., preferably 200 to 350° C., more preferably 230 to 330° C. If the resin temperature is too low, the melt flowability of the resin composition is deteriorated, and the resulting molded article tends to cause sink mark and distortion. If the resin temperature is too high, silver streak is easy to occur due to thermal decomposition of the resin, or the resulting molded article is liable to be yellowed.

No particular limitation is imposed on the form of the formed or molded article. As examples thereof, may be mentioned a rod, plate, sphere, column, cylinder, fiber, film and sheet. It is also permissible that the resin composition is coextruded with other resins, a formed or molded article composed of he resin composition is laminated on another material, and a coating layer or deposit layer of another material is formed on a formed or molded article composed of he resin composition.

6. Light Guide Plate:

The resin composition according to the present invention is suitable for use as a forming or molding material for light guide plates for plane emission illuminators in liquid crystal display devices. More specifically, the light guide plate according to the present invention can be obtained by forming or molding a resin composition obtained by mixing the vinyl alicyclic hydrocarbon polymer, HALS and optionally various kinds of the compounding additives. As a forming or molding process, may be adopted a heating and melt forming or molding process such as an injection molding process, extrusion process, press molding process or blow molding process, or a solution casting process. Among these forming or molding processes, the injection molding process, extrusion process and press molding process are preferably used for the purpose of obtaining a light guide plate excellent in transparency, and the injection molding process is more preferred.

The form and size of the light guide plate may be suitably determined as needed. A commonly used light guide plate has a thickness of generally 0.05 to 6 mm, preferably 0.1 to 4 mm, a width of generally 50 to 400 mm, preferably 100 to 350 mm and a length of generally 50 to 350 mm, preferably 70 to 300 mm. The light guide plate may be in a tapered (wedge) form that the thickness is successively changed in the longitudinal direction thereof.

EXAMPLES

The present invention will hereinafter be described more specifically by the following Preparation Examples, Examples and Comparative Examples. All designations of part or parts and % as will be used in the following examples mean part or parts by weight and % by weight unless expressly noted.

Various physical properties were determined in accordance with the following respective methods:

(1) Glass Transition Temperature (Tg):

Tg of a polymer sample was measured by a differential scanning calorimeter (DSC) in accordance with JIS K-7121. A value found from a displacement point on a high-temperature side was regarded as Tg of the polymer.

(2) Molecular Weight:

The molecular weight of a polymer sample was determined as a weight average molecular weight (Mw) in terms of polystyrene as measured by GPC using toluene as a solvent. With respect to block copolymers, GPC measurement was conducted by using tetrahydrofuran (THF) as a solvent.

(3) Molecular Weight Distribution:

The molecular weight distribution of a polymer sample was determined by finding a weight average molecular weight (Mw) and a number average molecular weight (Mn) in terms of polystyrene as measured by GPC using toluene as a solvent and calculating a ratio (Mw/Mn) of Mw to Mn. With respect to block copolymers, however, GPC measurement was conducted by using tetrahydrofuran (THF) as a solvent.

(4) Rate of Hydrogenation:

Rates of hydrogenation in the aromatic rings and main chain in a polymer sample were calculated by measuring $^1$H-NMR.

(5) Molecular Weight of Hindered Amine Light-resistance Stabilizer:

The number average molecular weight of each hindered amine type light-resistance stabilizer was determined by GPC using THF as a solvent.

(6) Light Transmittance:

The light transmittance (%) of each molded article was measured at a portion having an optical path length of 250 mm in a light guide plate by means of a spectrophotometer (U-30, manufactured by Nippon Bunko-sha).

(6) Light Resistance:

With respect to the evaluation of light resistance, a back light unit assembled with a light guide plate in accordance with a method described below was continuously lighted for 1,500 hours, and a yellow index (ΔYI) of a long optical path (optical path length: 250 mm) of the light guide plate used was then measured by means of a long optical path color-difference meter (ASA-300A, manufactured by Nippon Denshoku Kogyo K. K.) to evaluate it as the degree of coloring.

(8) Evaluation of Gas Generation:

With respect to the generation of gases, a back light unit assembled with a light guide plate in accordance with the method described below was continuously lighted for 1,500 hours, and whether a lamp reflector covering a cold cathode-ray tube was clouded or not was then visually observed, thereby evaluating it in accordance with the following standard:

⊚: No clouding was observed;

o: Clouding was somewhat observed at end portions of the reflector, but the luminance of the light guide plate was not affected to cause no problem on practical use;

Δ: The luminance of the light guide plate was slightly lowered at its end portions because end portions of the reflector was slightly clouded;

X: The whole reflector was clouded, and the luminance of the whole reflector was lowered.

(9) Processing Ability:

With respect to the processing ability (processing stability), a ratio (A/B×100) of an amount (A) of HALS added to a vinyl alicyclic hydrocarbon polymer upon twin-screw kneading, which will be described subsequently, to an amount (B) of HALS actually contained in the vinyl alicyclic hydrocarbon polymer was determined as a retention rate to evaluate it.

(10) Flexural Strength:

A polymer sample was injection-molded to prepare a specimen having a length of 127 mm, a width of 12.7 mm and a thickness of 3 mm. This specimen was used to measure the flexural strength of the specimen by means of a Strograph (V10-B, manufactured by Toyo Seiki Seisaku-sho Co., Ltd.) in accordance with ASTM D-790, thereby evaluating it in accordance with the following standard:

⊚: A yielding point or break strength was 500 kgf/cm$^2$ or higher;

o: Break strength was not lower than 400 kgf/cm$^2$, but lower than 500 kgf/cm$^2$;

X: Break strength was lower than 400 kgf/cm$^2$.

(11) Birefringence:

A copolymer sample was injection-molded to form an optical disk substrate having a diameter of 85 mm. A birefringence value of this optical disk substrate at a position within a radius of 25 mm of the center was measured by means of a polarization microscope (manufactured by NIKON CORP.; 546 nm Senarmont compensator) to evaluate it in accordance with the following standard:

⊚: 5 nm or less;

o: More than 5 nm, but not more than 10 nm;

X: More than 10 nm.

Preparation Example 1

Preparation of Hydrogenated Product of Vinyl Aromatic Polymer

After a stainless steel-made reactor equipped with a stirrer was fully dried and purged with nitrogen, 960 parts of dehydrated cyclohexane, 240 parts of a styrene monomer and 3.81 parts of dibutyl ether were charged therein. While stirring the contents of the reactor at 40° C., 0.65 parts of a 15% hexane solution of n-butyllithium were added thereto to initiate polymerization. After conducting the polymerization for 3 hours at 40° C., 1.26 parts of isopropyl alcohol were added to stop the reaction. Mw of a vinyl aromatic polymer (polystyrene) thus obtained was 180,000, and Mw/Mn was 1.04.

Then, 1200 parts of the solution containing the vinyl aromatic polymer were transferred to a pressure reaction vessel equipped with a stirrer. To this reaction vessel, were added 24 parts of nickel-diatomaceous earth (N113, product of Nikki Chemical Co., Ltd.; amount of nickel carried: 40%), and the mixture was stirred. The interior of the reaction vessel was purged with hydrogen gas, and hydrogen was supplied at 150° C. with stirring to conduct a hydrogenation reaction for 6 hours while retaining the pressure to 70 kg/cm$^2$. After completion of the hydrogenation reaction, the reaction solution was filtered to remove the catalyst. After removing the catalyst, 1,200 parts of cyclohexane were added to dilute the solution. This diluted solution was further filtered through a filter having a pore size of 1 μm under environment of a cleanliness class of 1000 to remove foreign matter. The resultant filtrate was poured into 9,000 parts of isopropanol filtered through a filter having an average pore size of 1 μm under environment of a cleanliness class of 1000 to deposit a hydrogenated product of the vinyl aromatic polymer. After the hydrogenated product was separated by filtration, it was dried at 100° C. for 48 hours by a vacuum dryer to collect the hydrogenated product of the vinyl aromatic polymer. The physical properties of the thus-obtained hydrogenated product were as follows:

Tg=149° C.; Mw=153,000; and Mw/Mn=1.09.

Preparation Example 2

Preparation of Block Copolymer (BL$_1$)

A stainless steel-made reactor fully dried, purged with nitrogen and equipped with a stirrer-was charged with 320 parts of dehydrated cyclohexane, 28 parts of a styrene monomer and 0.40 parts of dibutyl ether. While stirring the contents of the reactor at 60° C., 0.30 parts of an n-butyllithium solution (15% hexane solution) were added thereto to initiate polymerization. After conducting the polymerization reaction for 1 hour, 24 parts of a monomer mixture composed of 16 parts of a styrene monomer and 8 parts of an isoprene monomer were added to conduct the polymerization reaction for additional 1 hour. Thereafter, 28 parts of a styrene monomer were further added to continue the polymerization reaction for 1 hour. To the reaction solution, were then added 0.2 parts of isopropyl alcohol to stop the reaction.

When the weight average molecular weight (Mw) and molecular weight distribution (Mw/Mn) of the thus-obtained block copolymer were measured. As a result, Mw was 122,000, and Mw/Mn was 1.06.

Then, 400 parts of the polymerization reaction solution were transferred to a pressure reaction vessel equipped with a stirrer. To this reaction vessel, were added 10 parts of a nickel catalyst carried on silica-alumina (E22U, product of Nikki Chemical Co., Ltd.; amount of nickel carried: 60%), and the mixture was stirred. The interior of the reaction vessel was purged with hydrogen gas, and hydrogen was supplied while stirring the solution to conduct a hydrogenation reaction for 8 hours at a temperature of 160° C. and a pressure of 4.5 MPa.

After completion of the hydrogenation reaction, the reaction solution was filtered to remove the hydrogenation catalyst. After removing the catalyst, 800 parts of cyclohexane were added to dilute the solution. This diluted solution was poured into 3,500 parts of isopropanol (filtered through a filter having an average pore size of 1 μm under environment of a cleanliness class of 1000) to deposit a block copolymer. The copolymer was separated and collected by filtration and dried at 80° C. for 48 hours under reduced pressure.

The thus-obtained block copolymer ($BL_1$) was a ternary block copolymer composed of a block (hereinafter abbreviated as "St") containing repeating units derived from styrene, a block (hereinafter abbreviated as "St/Ip") containing repeating units derived from styrene and isoprene and a block (St) containing repeating units derived from styrene.

A molar ratio among the respective blocks in this block copolymer [St-(St/Ip)-St copolymer] was St:(St/Ip):St= 33:34 (St:Ip=19:15):33. The physical properties of the block copolymer were as follows:

Mw=91,200; Mw/Mn=1.12; hydrogenation rate of the main chain and aromatic ring=99.9%; Tg=125.5° C.; flexural strength=500 kgf/cm² or higher (⊚); and birefringence value=5 nm or less (⊚).

Preparation Example 3

Preparation of Block Copolymer ($BL_2$)

The same stainless steel-made reactor as that used in Preparation Example 2 was charged with 320 parts of dehydrated cyclohexane, 56 parts of a styrene monomer and 0.40 parts of dibutyl ether. While stirring the contents of the reactor at 60° C., 0.30 parts of an n-butyllithium solution (15% hexane solution) were added thereto to initiate polymerization. After conducting the polymerization reaction for 1 hour, 24 parts of a monomer mixture composed of 16 parts of a styrene monomer and 8 parts of an isoprene monomer were added to conduct the polymerization reaction for additional 1 hour. To the reaction solution, were added 0.2 parts of isopropyl alcohol to stop the reaction. When the weight average molecular weight (Mw) and molecular weight distribution (Mw/Mn) of the thus-obtained block copolymer were measured. As a result, Mw was 131,000, and Mw/Mn was 1.06.

A hydrogenation reaction was then conducted in the same manner as Preparation Example 2.

The thus-obtained block copolymer ($BL_2$) was a binary block copolymer composed of St and St/Ip. A molar ratio among the respective blocks was St:(St/Ip)=66:34 (St:Ip= 19:15). The physical properties of the block copolymer were as follows:

Mw=92,300; Mw/Mn=1.11; hydrogenation rate=99.9%; Tg=127.1° C.; flexural strength=500 kgf/cm² or higher (⊚); and birefringence value=5 nm or less (⊚).

Preparation Example 4

Preparation of Block Copolymer ($BL_3$)

The same stainless steel-made reactor as that used in Preparation Example 2 was charged with 320 parts of dehydrated cyclohexane, 3.2 parts of a styrene monomer and 0.40 parts of dibutyl ether. While stirring the contents of the reactor at 60° C., 0.30 parts of an n-butyllithium solution (15% hexane solution) were added thereto to initiate polymerization. After conducting the polymerization reaction for 2 hours, 76.8 parts of a monomer mixture composed of 65.6 parts of a styrene monomer and 11.2 parts of an isoprene monomer were added to conduct the reaction for additional 1 hour. To the reaction solution, were added 0.2 parts of isopropyl alcohol to stop the reaction. When the weight average molecular weight (Mw) and molecular weight distribution (Mw/Mn) of the thus-obtained block copolymer were measured. As a result, Mw was 128,000, and Mw/Mn was 1.07.

A hydrogenation reaction was then conducted in the same manner as Preparation Example 2. The thus-obtained block copolymer ($BL_3$) was a binary block copolymer composed of St and St/Ip. A molar ratio among the respective blocks was St:(St/Ip)=4:96 (St:Ip=76.8:19.2). The physical properties of the block copolymer were as follows:

Mw=92,300; Mw/Mn=1.12; hydrogenation rate=99.9%; Tg=126.5° C.; flexural strength=not lower than 400 kgf/cm² but lower than 500 kgf/cm² (∘); and birefringence value= more than 5 nm but not more than 10 nm (∘).

Example 1

To 100 parts of the vinyl aromatic polymer prepared in Preparation Example 1 were added 0.1 parts of a soft polymer (Toughtec H1052, product of Asahi Chemical Industry Co., Ltd.) and 0.1 parts of an antioxidant (Irganox 1010; product of CIBA-GEIGY AG), and 0.2 parts of a polycondensate [HALS ($H_1$); Mn=3000] of dibutylamine, 1,3,5-triazine, N,N'-bis(2,2,6,6-tetramethyl-4-piperidyl)-1, 6-hexamethylenediamine and N-(2,2,6,6-tetramethyl-4-piperidyl)butylamine were further added as HALS to knead these components by means of a twin-screw kneader (TEM-35B, manufactured by Toshiba Machine Co., Ltd.; screw diameter=37 mm, L/D=32, screw speed=150 rpm, resin temperature=240° C., feed rate=20 kg/hr). The kneaded mixture was extruded into a strand. This strand was cooled with water and cut by a pelletizer to provide pellets.

The content of HALS ($H_1$) in the pellets was measured by gas chromatography and was found to be 0.2% based on the whole weight of the resin composition, and so a ratio (retention rate) of an actual content of HALS to an amount of HALS added was substantially 100%.

After the pellets thus obtained were dried at 70° C. for 2 hours by means of an air-circulated hot-air dryer to remove water, a light guide plate 10.4 inches in size was molded by injection molding using an injection molding machine (Lot No. IS450, manufactured by Toshiba Machine Co., Ltd.) of a side gate mold system having a hot runner. The molding was conducted under conditions of a mold temperature of 80° C. and a cylinder temperature of 280° C.

The thus-obtained light guide plate was such a wedge form that a thickness of a thick wall portion on the side of a plane of incidence is 2.5 mm, a thickness of a thin wall portion on the opposite side is 1.5 mm, a length from the thick wall portion to the thin wall portion is 190 mm, a length along an axial direction of a linear light source is 250 mm, and the thickness becomes gradually thin as it leaves from the thick wall portion to the thin wall portion (in a direction substantially perpendicular to the axis of the linear light source). The light transmittance of the light guide plate was measured at the portion 250 mm in length along the axial direction and found to be 85%.

A white ink pattern for light reflection was formed on one side of the widest surface of the light guide plate. The end surface of the portion 2.5 mm in thickness of the light guide plate was used as a plane of incidence, a cold cathode-ray tube and a lamp reflector were provided on said end surface side, and a light reflection sheet was provided on the end surface to fabricate a back light unit.

After the cold cathode-ray tube was continuously lighted for 1,500 hours, the degree of coloring (yellow index) of the light guide plate was determined, and the clouded state of the lamp reflector was visually observed. The results are shown in Table 1.

Example 2

A resin composition was prepared in the same manner as in Example 1 except that a polymer [HALS ($H_2$); Mn=3,550] of dimethyl succinate and 4-hydroxy-2,2,6,6-tetramethyl-1-piperidine ethanol was used as HALS, and the resin composition was used to fabricate a light guide plate and evaluate it. The results are shown in Table 1.

Comparative Example 2

A resin composition was prepared in the same manner as in Example 1 except that bis(2,2,6,6-pentamethyl-4-piperidyl){[3,5-bis(1,1-dimethylethyl)-4-hydroxyphenyl]methyl}butyl malonate [HALS ($H_5$); Mn=685] was used as HALS, and the resin composition was used to fabricate a light guide plate and evaluate it. The results are shown in Table 1.

Comparative Example 3

A resin composition was prepared in the same manner as in Example 1 except that a mixture [HALS ($H_6$); Mn=509] of bis(1,2,2,6,6-pentamethyl-4-piperidyl) sebacate and methyl-1,2,2,6,6-pentamethyl-piperidyl sebacate was used as HALS, and the resin composition was used to fabricate a light guide plate and evaluate it. The results are shown in Table 1.

Comparative Example 4

A resin composition was prepared in the same manner as in Example 1 except that the amount of HALS ($H_1$) added was changed from 0.2 parts by weight to 25 parts by weight, and the resin composition was used to fabricate a light guide plate and evaluate it. The results are shown in Table 1.

TABLE 1

| | Resin composition (parts) | | | | | Processing ability | | Light resistance | Generation of gas |
|---|---|---|---|---|---|---|---|---|---|
| | | | | HALS | | Retention | | ΔYI after | Clouding |
| | Hydrogenated polystyrene | Soft polymer | Anti-oxidant | Kind | Molecular weight | Amount added | rate of HALS | Light transmittance | continuous Lighting | of reflector |
| Ex. 1 | 100 | 0.1 | 0.1 | $H_1$ | 3000 | 0.2 | 100 | 85 | 15.8 | ⊙ |
| Ex. 2 | 100 | 0.1 | 0.1 | $H_2$ | 3550 | 0.2 | 100 | 82 | 16.4 | ⊙ |
| Ex. 3 | 100 | 0.1 | 0.1 | $H_3$ | 2550 | 0.2 | 95 | 87 | 16.1 | ○ |
| Comp. Ex. 1 | 100 | 0.1 | 0.1 | $H_4$ | 481 | 0.2 | 70 | 88 | 21.5 | X |
| Comp. Ex. 2 | 100 | 0.1 | 0.1 | $H_5$ | 685 | 0.2 | 75 | 87 | 19.2 | Δ |
| Comp. Ex. 3 | 100 | 0.1 | 0.1 | $H_6$ | 509 | 0.2 | 70 | 89 | 20.7 | X |
| Comp. Ex. 4 | 100 | 0.1 | 0.1 | $H_1$ | 3000 | 25 | 90 | 79 | 18.5 | Δ |

Example 3

A resin composition was prepared in the same manner as in Example 1 except that poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}] [HALS ($H_3$); Mn=2,550] was used as HALS, and the resin composition was used to fabricate a light guide plate and evaluate it. The results are shown in Table 1.

Comparative Example 1

A resin composition was prepared in the same manner as in Example 1 except that bis(2,2,6,6-tetramethyl-4-piperidyl) sebacate [HALS ($H_4$); Mn=481] was used as HALS, and the resin composition was used to fabricate a light guide plate and evaluate it. The results are shown in Table 1.

Example 4

A resin composition was prepared in the same manner as in Example 1 except that 0.1 parts of 2-(2'-hydroxy-5'-methylphenyl)benzotriazole [ultraviolet absorbent ($U_1$)] was further added, and the resin composition was used to fabricate a light guide plate and evaluate it. The results are shown in Table 2.

Example 5

A resin composition was prepared in the same manner as in Example 1 except that 0.1 parts of 2-(2H-benzo-triazol-2-yl)-4-methyl-6-(3,4,5,6-tetrahydrophthalimidyl-methyl)-phenol [ultraviolet absorbent ($U_2$)] was further added, and the resin composition was used to fabricate a light guide plate and evaluate it. The results are shown in Table 2.

Example 6

A resin composition was prepared in the same manner as in Example 1 except that 0.1 parts of 2-(2H-benzotriazol- 2-yl)-4,6-bis(1-methyl-1-phenylethyl)phenol [ultraviolet absorbent ($U_3$)] was further added, and the resin composition was used to fabricate a light guide plate and evaluate it. The results are shown in Table 2.

Example 7

A resin composition was prepared in the same manner as in Example 1 except that the block copolymer ($BL_1$) prepared in Preparation Example 2 was used in place of the vinyl aromatic polymer prepared in Preparation Example 1, and the resin composition was used to fabricate a light guide plate and evaluate it. The results are shown in Table 3.

Example 8

A resin composition was prepared in the same manner as in Example 1 except that the block copolymer ($BL_2$) prepared in Preparation Example 3 was used in place of the vinyl aromatic polymer prepared in Preparation Example 1, and the resin composition was used to fabricate a light guide plate and evaluate it. The results are shown in Table 3.

Example 9

A resin composition was prepared in the same manner as in Example 1 except that the block copolymer ($BL_3$) prepared in Preparation Example 4 was used in place of the vinyl aromatic polymer prepared in Preparation Example 1, and the resin composition was used to fabricate a light guide plate and evaluate it. The results are shown in Table 3.

Example 10

A resin composition was prepared in the same manner as in Example 7 except that 0.1 parts of 2-(2'-hydroxy-5'-methylphenyl)benzotriazole [ultraviolet absorbent ($U_1$)] was further added, and the resin composition was used to fabricate a light guide plate and evaluate it. The results are shown in Table 4.

Example 11

A resin composition was prepared in the same manner as in Example 7 except that 0.1 parts of 2-(2H-benzo-triazol-2-yl)-4-methyl-6-(3,4,5,6-tetrahydrophthalimidyl-methyl)-phenol [ultraviolet absorbent ($U_2$)] was further added, and the resin composition was used to fabricate a light guide plate and evaluate it. The results are shown in Table 4.

Example 12

A resin composition was prepared in the same manner as in Example 7 except that 0.1 parts of 2-(2H-benzotriazol-2-yl)-4,6-bis(1-methyl-1-phenylethyl)phenol [ultraviolet absorbent ($U_3$)] was further added, and the resin composition was used to fabricate a light guide plate and evaluate it. The results are shown in Table 4.

TABLE 2

| | Resin composition (parts) | | | | | | | Processing ability | Light resistance | Generation of gas |
|---|---|---|---|---|---|---|---|---|---|---|
| | Hydrogenated polystyrene | Soft polymer | Antioxidant | HALS Kind | Molecular weight | Amount added | UV absorbent Kind | Amount added | Retention rate of HALS | Light transmittance | ΔYI after continuous lighting | Clouding of reflector |

| | Hydrogenated polystyrene | Soft polymer | Antioxidant | Kind | Molecular weight | Amount added | Kind | Amount added | Retention rate of HALS | Light transmittance | ΔYI after continuous lighting | Clouding of reflector |
|---|---|---|---|---|---|---|---|---|---|---|---|---|
| Ex. 4 | 100 | 0.1 | 0.1 | $H_1$ | 3000 | 0.2 | $U_1$ | 0.1 | 100 | 85 | 15.2 | ⊚ |
| Ex. 5 | 100 | 0.1 | 0.1 | $H_1$ | 3000 | 0.2 | $U_2$ | 0.1 | 100 | 85 | 15.4 | ⊚ |
| Ex. 6 | 100 | 0.1 | 0.1 | $H_1$ | 3000 | 0.2 | $U_3$ | 0.1 | 100 | 84 | 15.5 | ⊚ |

TABLE 3

| | Block copolymer Kind | Amount added | Soft polymer | Antioxident | HALS Kind | molecular weight | Amount added | Processing ability Retention rate of HALS | Light transmittance | Light resistance ΔYI after continuous lighting | Generation of gas Clouding of reflector |
|---|---|---|---|---|---|---|---|---|---|---|---|
| Ex. 7 | $BL_1$ | 100 | 0.1 | 0.1 | $H_1$ | 3000 | 0.2 | 100 | 85 | 15.6 | ⊚ |
| Ex. 8 | $BL_2$ | 100 | 0.1 | 0.1 | $H_1$ | 3000 | 0.2 | 100 | 85 | 15.5 | ⊚ |
| Ex. 9 | $BL_3$ | 100 | 0.1 | 0.1 | $H_1$ | 3000 | 0.2 | 100 | 82 | 15.5 | ⊚ |

TABLE 4

| | Resin composition (parts) | | | | | | | | Processing ability | Light resistance | | Generation of gas |
|---|---|---|---|---|---|---|---|---|---|---|---|---|
| | Block copolymer | | | | HALS | | UV absorbent | | retention | Light | ΔYI after | Clouding |
| | | Amount | Soft | Anti- | | Molecular | Amount | | Amount | rate of | transmit- | continuous | of |
| | Kind | added | polymer | oxidant | Kind | weight | added | Kind | added | HALS | tance | lighting | reflector |
| Ex. 10 | BL₁ | 100 | 0.1 | 0.1 | H₁ | 3000 | 0.2 | U₁ | 0.1 | 100 | 85 | 15.1 | ⊙ |
| Ex. 11 | BL₁ | 100 | 0.1 | 0.1 | H₁ | 3000 | 0.2 | U₂ | 0.1 | 100 | 85 | 15.3 | ⊙ |
| Ex. 12 | BL₁ | 100 | 0.1 | 0.1 | H₁ | 3000 | 0.2 | U₃ | 0.1 | 100 | 84 | 15.3 | ⊙ |

INDUSTRIAL APPLICABILITY

According to the present invention, there are provided resin compositions which are excellent in transparency, heat resistance and processing stability, are not colored even when they are used for a long period of time under lighting and do not generate gases. According to the present invention, there are provided light guide plates obtained by forming or molding such a resin composition, having excellent transparency, heat resistance and light resistance and undergoing no generation of gases. The light guide plates according to the present invention are useful in the technical field of liquid crystal display devices as light guide plates for plane emission illuminators.

What is claimed is:

1. A resin composition comprising a vinyl alicyclic hydrocarbon polymer which is a homopolymer or copolymer containing, in its main chain, repeating units [1] of a structure represented by the following formula (1):

(1)

wherein X is an alicyclic hydrocarbon group, and $R^1$ to $R^3$ are, independently of one another, a hydrogen atom, linear hydrocarbon group, halogen atom, alkoxy group, hydroxyl group, ester group, cyano group, amide group, imide group, silyl group, or linear hydrocarbon group substituted by a polar group, and the content of the repeating units [1] in the vinyl alicyclic hydrocarbon polymer is at least 50% by weight, and which has a saturated alicyclic hydrocarbon group containing carbon-carbon unsaturated bonds of at most 20% based on the whole carbon-carbon bond, and 0.01 to 20 parts by weight, per 100 parts by weight of the vinyl alicyclic hydrocarbon polymer, of a hindered amine light-resistance stabilizer having a plurality of piperidine rings with substituent group(s) bonded to both carbon atoms adjacent to the nitrogen atom and having a number average molecular weight (Mn) of 1,000 to 10,000 as determined by gel permeation chromatography.

2. The resin composition according to claim 1, wherein the hindered amine light-resistance stabilizer has a melting point of at least 20° C.

3. The resin composition according to claim 1, wherein the hindered amine light-resistance stabilizer is a high molecular weight hindered amine type light-resistance stabilizer with a plurality of piperidine rings bonded through a triazine skeleton.

4. The resin composition according to claim 1, wherein the hindered amine light-resistance stabilizer is a high molecular weight hindered amine type light-resistance stabilizer with a plurality of piperidine rings bonded through an ester linkage.

5. The resin composition according to claim 1, which further comprises an ultraviolet absorbent.

6. The resin composition according to claim 5, wherein the ultraviolet absorbent is at least one compound selected from the group consisting of 2-(2'-hydroxy-5'-methylphenyl)benzotriazole, 2-(2H-benzotriazol-2-yl)-4-methyl-6-(3,4,5,6-tetrahydrophthalimidylmethyl)phenol and 2-(2H-benzotriazol-2-yl)-4,6-bis(1-methyl-1-phenylethyl)-phenol.

7. The resin composition according to claim 1, which further comprises at least one compounding additive selected from the group consisting of (i) a soft polymer, (ii) an alcoholic compound and (iii) an organic or inorganic filler.

8. The resin composition according to claim 1, wherein the vinyl alicyclic hydrocarbon polymer is a hydrogenated product of a polymer of a vinyl aromatic compound.

9. The resin composition according to claim 1, wherein the vinyl alicyclic hydrocarbon polymer is a hydrogenated product of a copolymer of a vinyl aromatic compound and a monomer copolymerizable with the vinyl aromatic compound.

10. The resin composition according to claim 1, wherein the vinyl alicyclic hydrocarbon polymer is a block copolymer containing a polymer block [A] containing repeating units [3] represented by the following formula (3):

(3)

wherein $R^3$ is a hydrogen atom or an alkyl group having 1 to 20 carbon atoms, and $R^4$ to $R^{14}$ are, independently of one another, a hydrogen atom, an alkyl group having 1 to 20 carbon atoms, a hydroxyl group, an alkoxy group having 1 to 20 carbon atoms or a halogen atom, and a polymer block [B] containing repeating units [5] represented by the following formula (5):

(5)

wherein $R^{15}$ is a hydrogen atom or an alkyl group having 1 to 20 carbon atoms, and/or repeating units [6] represented by the following formula (6):

(6)

wherein $R^{16}$ to $R^{17}$ are, independently of each other, a hydrogen atom or an alkyl group having 1 to 20 carbon atoms, and wherein the total content of the repeating units [3] in the block copolymer is at least 50% by weight.

11. The resin composition according to claim 10, wherein the block copolymer further contains the repeating units [3] in the polymer block [B], and a mole fraction a (mol %) of the repeating units in the polymer block and a mole fraction b (mol %) of the repeating units [3] in the polymer block [B] satisfy the relationship of a>b.

12. The resin composition according to claim 10, wherein supposing that the number of moles of the whole repeating unit [A] forming the block is $m_a$, and the number of moles of the whole repeating unit forming the block [B] is $m_b$, a ratio ($m_a$:$m_b$) thereof is 4:96 to 96:4.

13. A light guide plate obtained by forming or molding the resin composition according to any one of claims 1 to 12.

* * * * *